(12) United States Patent
Daemmrich et al.

(10) Patent No.: US 8,723,456 B2
(45) Date of Patent: May 13, 2014

(54) PROCEDURE AND DEVICE FOR CONTROLLING ACTUATORS

(75) Inventors: Uwe Daemmrich, Illingen (DE); Guido Kalbas, Wattenweiler (DE)

(73) Assignee: Robert Bosch GmbH, Stuttgart (DE)

( * ) Notice: Subject to any disclaimer, the term of this patent is extended or adjusted under 35 U.S.C. 154(b) by 365 days.

(21) Appl. No.: 13/009,349

(22) Filed: Jan. 19, 2011

(65) Prior Publication Data

US 2011/0175555 A1    Jul. 21, 2011

(30) Foreign Application Priority Data

Jan. 19, 2010 (DE) .......................... 10 2010 001 004

(51) Int. Cl.
*H02K 41/00* (2006.01)
(52) U.S. Cl.
USPC ............................. 318/135; 318/599; 318/606
(58) Field of Classification Search
USPC ........ 318/135, 599, 606, 811; 310/20; 353/30
See application file for complete search history.

(56) References Cited

U.S. PATENT DOCUMENTS

| 6,297,941 B1 | 10/2001 | Hoffmann et al. |
| 2003/0033799 A1 | 2/2003 | Scheying |
| 2006/0250583 A1* | 11/2006 | Huibers et al. .................. 353/30 |
| 2008/0122299 A1* | 5/2008 | Cristoforo et al. .............. 310/20 |
| 2011/0292022 A1* | 12/2011 | Lee et al. ....................... 345/212 |

FOREIGN PATENT DOCUMENTS

| DE | 10139142 | 2/2003 |
| EP | 0 563 760 | 10/1993 |
| WO | WO 2008/071533 | 6/2008 |

OTHER PUBLICATIONS

Weisweiler "Entfernung von Stickstoffoxiden aus Sauer-stoff enthaltenden Automobil-Abgasen", *Chemie Ingenieur Technik* (72), pp. 441-449. (See English Abstract), May 2000.

* cited by examiner

*Primary Examiner* — Karen Masih
(74) *Attorney, Agent, or Firm* — Michael Best & Friedrich LLP

(57) ABSTRACT

A procedure for controlling actuators within an on-board power system, which provides different operating voltages and temporal on-board power voltage changes. The actuator or actuators are controlled with different pulse-width modulated control signals, whereby the pulse-width and the cycle duration of the control signals can be adjusted independent of each other and are adjusted independent of the actually applied on-board power voltage. Control signals for the actuators can be specified by a control unit. The actuator or actuators can be controlled with the aid of the control unit by different pulse-width modulated control signals, whereby the pulse-width and the cycle duration of the control signals can be adjusted independent of each other; and the control unit provides devices for detecting the actually applied on-board power voltage and driver units.

9 Claims, 3 Drawing Sheets

PROCEDURE AND DEVICE FOR CONTROLLING ACTUATORS

This application claims benefit of Serial No. 10 2010 001 004.9, filed 19 Jan. 2010 in Germany and which application are incorporated herein by reference. To the extent appropriate, a claim of priority is made to the above disclosed application.

BACKGROUND

The invention relates to a procedure for controlling actuators within an on-board power system, which provides different operating voltages or temporal on-board power voltage changes.

The invention furthermore relates to a corresponding device for implementing the procedure according to the invention.

The controlling of the any actuator, for example a magnetic coil of a valve, or the operation of sensors in a motor vehicle depends on the control voltage and therefore on the on-board voltage of the operating system and on the capacity of the hardware of the actuator or the sensor.

The operating voltage or the on-board power voltage can vary between 6 V and 32 V, and higher. Current motor vehicles and motorbikes have a usual on-board power supply with an operating voltage of 12 V. trucks on the other hand have an on-board power supply with a 24 V operating voltage. For each of these different on-board power supplies an individual driver to be developed for the corresponding case of application and the corresponding hardware, in order to maintain an optimal functionality of the actuators or the sensors at complex control applications.

An example of a system with a complex controlling application for an actuator is a reducing agent metering system for an exhaust gas purification system of a diesel combustion engine, which is commercially available under the name DENOXTRONIC of the applicant. With this system, which is a central component of a SCR-system (selective catalytic reduction) and which has been successfully used in Europe since 2004 in heavy utility vehicles, the emissions of diesel engines can be significantly reduced. In order to reduce the NOx-emission (DeNox) of diesel engines, with temporally mainly lean, i.e. oxygen-rich exhaust gas, a defined amount of a selectively working reducing agent is added to the exhaust gas in this procedure. This can for example be in the form of ammoniac, which is directly metered in the form of gas, or is also won from a precursor in the form of urea or of a urea-water solution. Such urea-water solution SCR-systems have been first used in the utility vehicle segment. DE 10139142 A1 describes an exhaust gas purification system of a combustion engine, at which a SCR-catalytic converter is used for reducing the NOx-emissions, which reduces nitrous gases that are contained in the exhaust gas with the reducing agent ammoniac to nitrogen. The ammoniac is won in a hydrolysis catalytic converter arranged upstream in front of the SCR catalytic converter from the urea-water solution, consistently called AdBlue® in the industry. The hydrolysis catalytic converter converts the urea contained in the urea-water solution to ammoniac and carbon dioxide. In a second step the ammoniac reduces the nitrous gases to nitrogen, whereby water is produced as side product. The exact process has been sufficiently described in the technical literature (compare Weissweller in cit (72), page 441-449, 2000). The urea-water solution is provided in a reducing agent tank. In this concrete case the actuator is the magnetic coil of the injection valve, which is built into the exhaust gas system of the diesel combustion engine and with which the urea-water solution can be injected in doses into the exhaust gas system.

Up to now profound hardware adjustments and software changes are required in order to adjust to the corresponding field of application with different on-board power supplies. Injection valves, which are for example construed for an on-board power supply with 12 V, cannot be operated without further ado at 24 V on-board power supply. So far another valve had to be built in at a control unit hardware defined for it, which is especially construed for 24 V or 12 V, and, within the range of the application software, another injection driver or an additional voltage divider.

With regard to a higher flexibility at the application and a reduction of the adjustment developing costs regarding the soft- and hardware that have been required up to now, it is the task of the invention to provide a procedure, with which a controlling of actuators is enabled that is independent of the on-board voltage.

It is furthermore the task of the invention to provide a device for implementing the procedure.

SUMMARY

The task concerning the device is thereby solved, in that the device provides a control unit, from which control signals for the actuators can be specified, whereby the actuator or the actuators can be controlled by the control unit by different pulse-width modulated control signals, so-called PWM signals, whereby the pulse-width and the cycle duration of the control signals can be adjusted independent of each other, and whereby the control unit provides devices for detecting the actually applied on-board power voltage as well as driver units, with which a pulse-width modulation (PWM) of the control signals can be specified at times and to which the actually applied on-board power voltage can be applied. The functionality can thereby be implemented in the control unit as hardware and/or software.

The procedure provides thereby that the actuator or actuators are controlled by different pulse-width modulated control signals, whereby the pulse-width and the cycle duration of the control signals can be adjusted independent of each other and are adjusted independent off the actually applied on-board power voltage.

With the procedure according to the invention and the device for implementing the procedure complex control applications of actuators can be realized independent of the on-board voltage, without having to carry out hardware changes of the actuators and/or of the control units or software adjustments. That is particularly advantageously with regard to a higher flexibility and a reduction of the adjustment developing costs. It does not matter thereby whether the actuator is for example designed for 12 V and is used at a higher voltage, for example at a 24 V on-board power supply.

It is provided in a preferred variant of the procedure, that it is switched from a first pulse-width modulation to a second pulse-width modulation of the control signal with the aid of a pulse-switch in the case of an erratic change of the on-board power voltage. With this reaction damages of the actuator during the operation can be avoided. It is thus for example provided, that the duty cycle is reduced at the pulse-width modulation, if the on-board power voltage increases. If the on-board power voltage sinks, the duty cycle can be increased.

It can be provided in a further variant of the procedure, that the pulse-width and/or the cycle duration of the control signals is quasi continuously adjusted at a continuous change of the on-board power voltage. A constant increase of the on-board power voltage causes for example a reduction of the high pulses. Alternatively the temporal distance between two consecutive high pulses of the pulse-width modulated control signal can be extended even at high pulse duration that remains constant. At a reduction of the on-board power voltage the duration of the high pulses is correspondingly increased or the temporal distance between two high pulses is reduced. If the level of the on-board power voltage comes close to the lower voltage limit, for which the actuator is construed, the temporal distance of two consecutive high pulses is practically zero, so that a permanent control of the actuator takes place in that case. The adjustment of the pulse durations or the pulse pause is thereby carried out in individual steps, i.e. from pulse to pulse, but since this can take place in very short time distances, according to a control frequency, a quasi continuous adaption can be assumed here.

Both adjustment variants are preferably construed in such a way that the adjustment of the pulse-width modulation is carried out in such a way that, independent of the actually applied on-board power voltage, the effective power of the control signal remains constant. Thereby it can be ensured, that an overload of the actuator is avoided. It can be provided in a further variant of the procedure that the control signal of the actuator is created from several temporarily consecutive pulse-width modulated signals, which provide different pulse-width modulations at times with different effective powers resulting correspondingly from that. It can thereby be achieved, that the effective power of the actuator can be specifically varied over the time. That can for example be advantageous if it has to be achieved, that the actuator should achieve its steady state very quickly when switching it on. Thus a heating element as actuator can for example achieve its nominal operating temperature if it is controlled with a PWM signal in its switch-on phase, which provides a higher duty cycle. But in order to avoid an overheating the duty cycle has to be reduced after the switch-on phase.

If the pulse-width of the control signal is adjusted during an active control phase of the actuator, it can be directly reacted upon the on-board power voltage change. It can be thereby be in particular be reacted upon a change of the voltage at longer control phases, without having to wait unit the next control cycle.

A particularly preferred application of the procedure, as described previously, provides the controlling of a magnetic coil of a metering valve for injecting a reducing agent into the exhaust gas system of a diesel combustion engine construed as actuator. This metering valve is a component of an exhaust gas purification system and is controlled by corresponding device drivers in a control unit, which can be integrated in a metering control unit of the exhaust gas purification system. A fairly complicated application software is thereby used.

It is thereby advantageous that the magnetic coil of the metering valve can be controlled need-based, according to its capacity. This also works with the above described procedure, if the on-board power voltage is significantly higher than the allowed operating voltage of the magnetic coil. The adjustment to the (changed) on-board power supply has only to be carried out by application parameters. The driver software converts this data into a corresponding control signal.

The power (the effective value of the PWM signal) can thereby also be adjusted to the magnetic coil at times by the different PWM signals. Thus the magnetic coil of the metering valve can for example be operated with a higher effective power at the beginning of the active metering cycle, in order to achieve a quick opening of the metering valve. After that, during a holding phase, the effective power can be reduced, so that a lower heat generation is affecting the coil.

The duty cycle can thus also be adjusted to the actually applied on-board power voltage during an active control of the magnetic coil of the metering valve. This is required if the on-board power voltage would be strongly varying. In the case of a quick increase of the on-board voltage the coil current can otherwise become too high, which would cause an increased heat generation in the coil up to its destruction. A voltage drop during the active control, i.e. during the metering, can on the other hand cause a sinking of the coil core, whereby the actual metering cycle could be interrupted, which again would diminish the exhaust gas behavior of the combustion engine. This can be particularly advantageously avoided with the above described procedure and the device.

BRIEF DESCRIPTION OF THE DRAWINGS

The invention is further explained with the aid of an embodiment that is illustrated in the figures. It is shown in.

DETAILED DESCRIPTION

Figure 1:
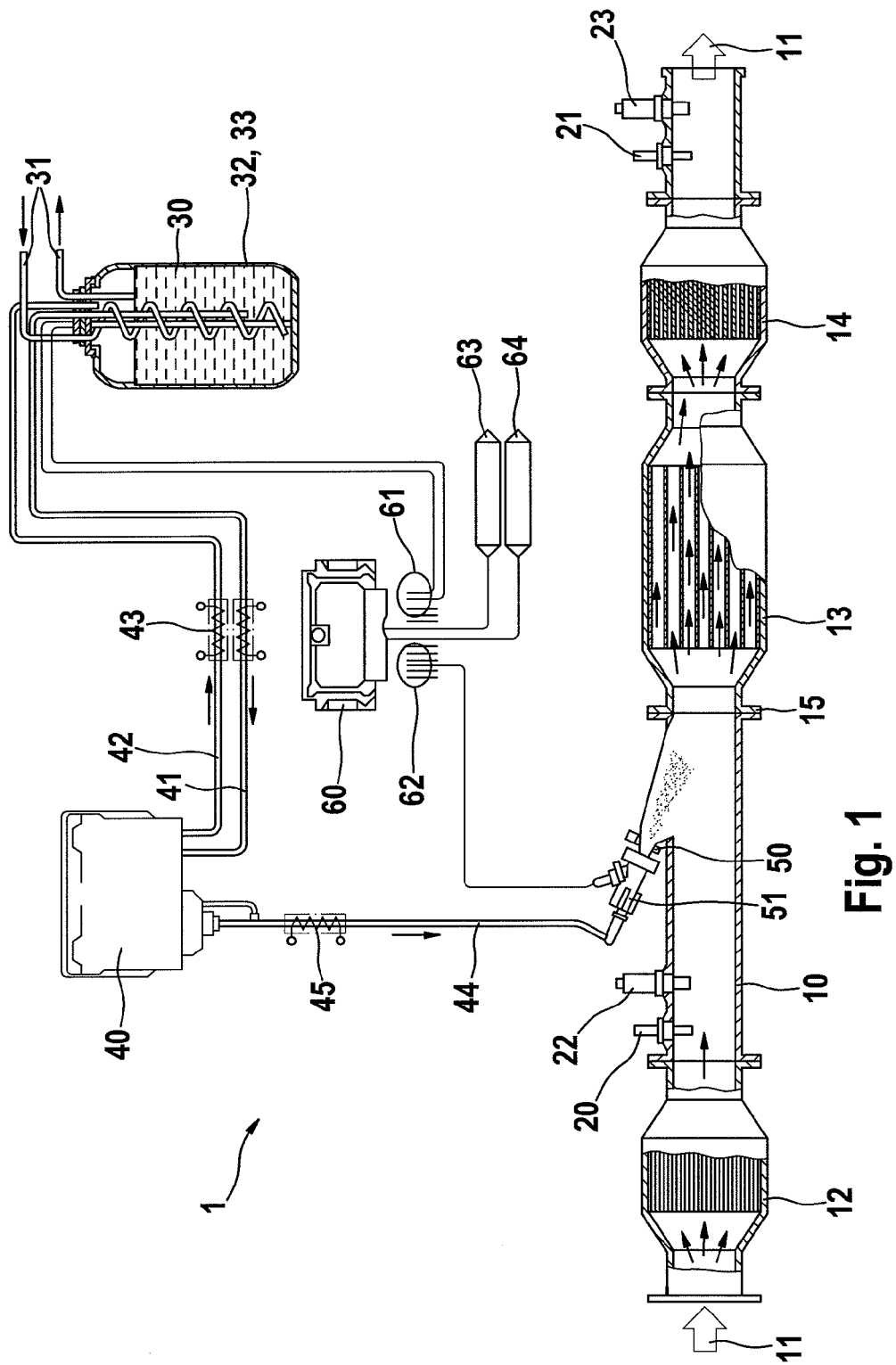
FIG. 1 in a schematic illustration the technical environment, in which the procedure can be applied, FIG. 2 a signal course diagram for a control signal of an actuator and FIG. 3 a further signal course diagram with a PWM pulse switch during the control phase of the actuator.

FIG. 1 schematically shows the technical environment, in which the procedure according to the invention can be applied.

FIG. 1 illustrates an exhaust gas purification system 1 of a diesel combustion engine, which provides an oxidization catalytic converter 12 (oxi-cat), a SCR catalytic converter (SCR-cat) as well as a further catalytic converter 14 (slip-cat) arranged downstream in its exhaust gas system 10 in the direction of the exhaust gas flow 11. A metering valve 50 is provided in flowing direction of the exhaust gas behind the oxidization catalytic converter 12, with which a reducing agent (AdBlue®) can metered for reducing the nitrous gases in the exhaust gas. A homogenization element 15 in the exhaust gas system 10 takes thereby care of an efficient turbulence.

For controlling the components that are built into the exhaust gas system as well as for regulating the exhaust gas purification system 1, a first temperature sensor 20 as well as a first NOx-sensor 22 are provided in the direction of the exhaust gas flow 11 behind the oxidization catalytic converter 12 (upstream temperature sensor or upstream NOx-sensor). A further temperature sensor 21 (downstream temperature sensor) as well as a further NOx-sensor 23 (downstream NOx-sensor) are provided on the output side behind the catalytic converter 14 in the shown embodiment. The sensors are connected with a not further illustrated engine control unit, the so-called ECU.

The metering valve 50 is supplied by a metering unit 40 with the liquid reducing agent over a valve feed line 44. The metering unit 40 is supplied on the input side over a reducing agent flow 41 and a reducing agent return 42, which have a connection to the reducing agent container 30, in which the reducing agent is stored. Heating elements 43,45 takes care that the reducing agent in the reducing agent flow 41 and the reducing agent return 42 as well as in the valve feed line 44 does not freeze at low surrounding temperatures.

The reducing agent container 30 provides a cooling system 31 in the shown embodiment for a temperature control of the reducing agent as well as a filling level sensor 32 and a temperature sensor 33, which serve for controlling and which are connected at their sensor input 61 with a metering control unit 60. The metering control unit 60 provides furthermore a control input 63 as well as an access to a diagnostic bus 64. The functionality of the above described procedure according to the invention is implemented in the metering control unit 60 with its variants as software driver. The magnetic coil 51 of the metering valve 50 is controlled over an actuator output 62 of the metering control unit 60 with different pulse-width modulated control signals 71, as they are for example illustrated in FIGS. 2 and 3, whereby the pulse-width and the cycle duration of the control signals 71 can be adjusted independent of each other and can be adjusted independent of the actually applied on-board power voltage.

Figure 2:
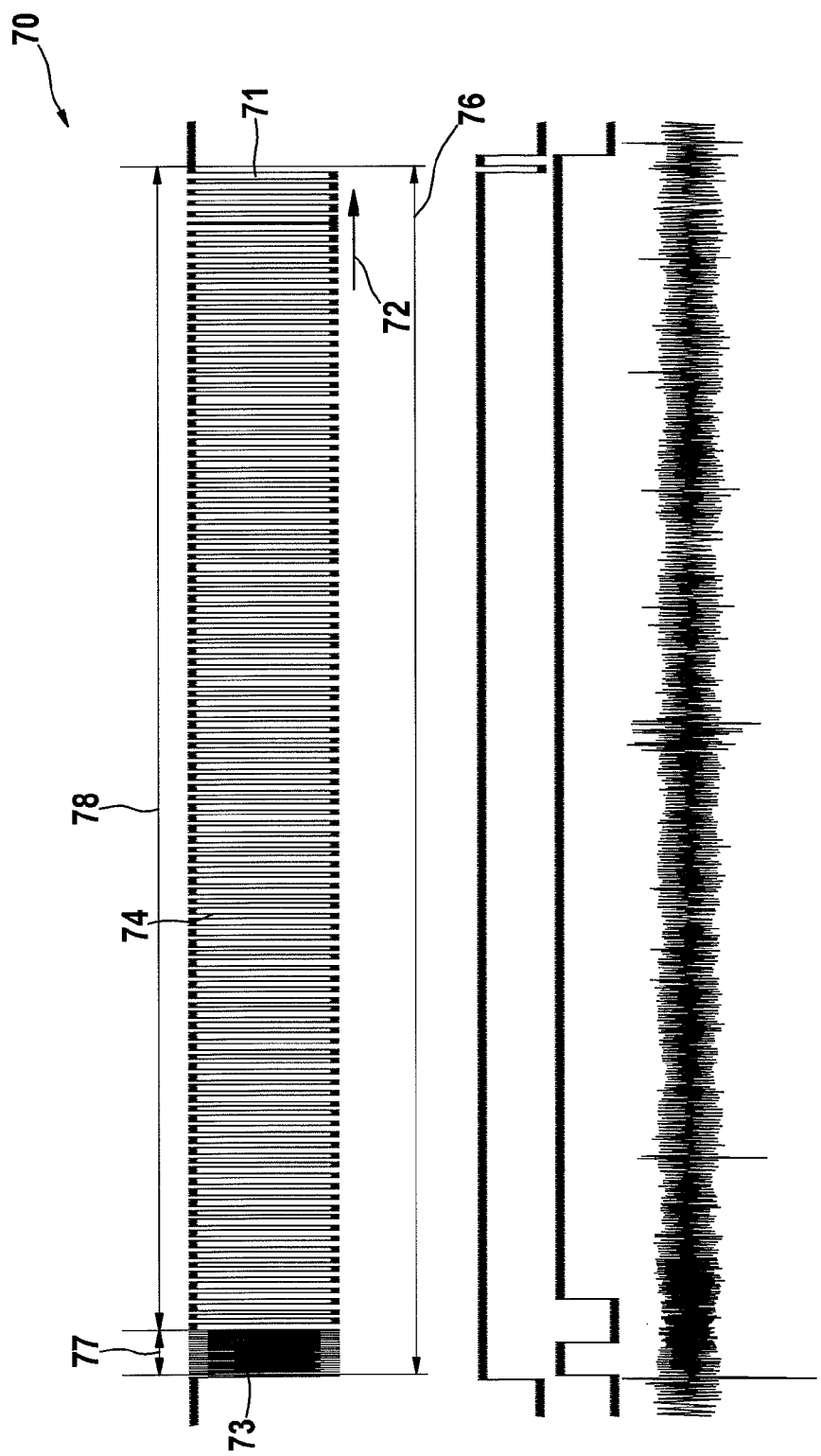

FIG. 2 shows a signal course diagram 70 as display plot, in which the control signal 71 for the magnetic coil 51 of the metering valve 50 from FIG. 1 is shown besides further signals depending on the time 72 for one metering cycle 76. At the beginning of the metering cycle 76 a switch-on pulse-width modulation 73 (PWM0) is provided for a switch-on phase 77, which provides a relatively high duty cycle, which can be recognized by the very short pauses between the pulses. This switch-on pulse-width modulation 73 ($PWM_0$) is required for a quick switching-on or opening of the metering valve 50. After the switch-on phase 77 the duty cycle is reduced, so that during the holding phase 78 that comes after the switch-on phase 77 another pulse-width modulation 74 ($PWM_1$) is used for the control signal 71. In that phase the effective power is reduced, because less energy is required for holding the coil core. Thereby less heat is converted in the magnetic coil 51. This reduced the energy consumption and mainly an excessive heat generation in the coil.

Figure 3:
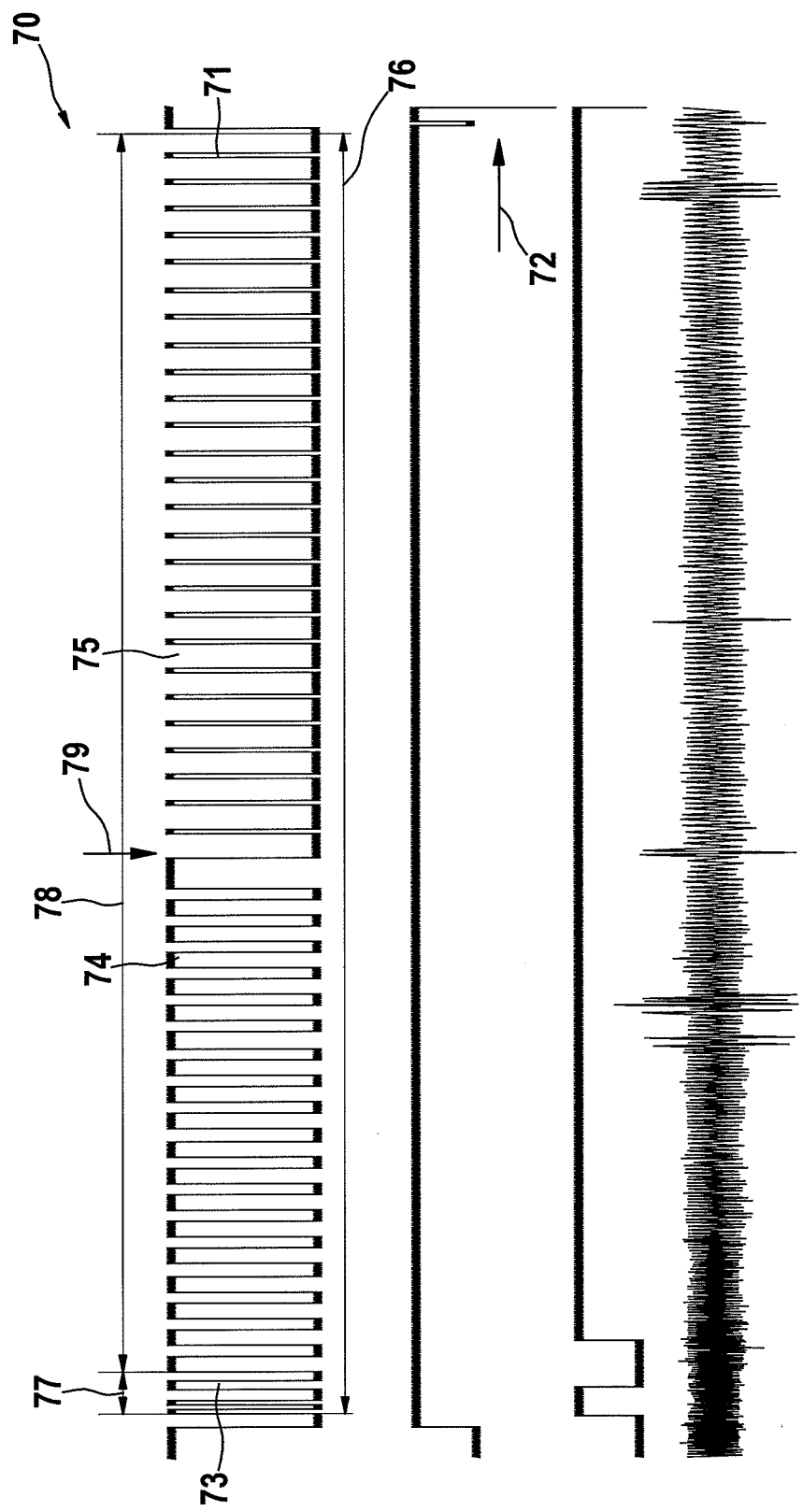

FIG. 3 shows a similar outline of the control signal 71 depending on the time 72 for a metering cycle 76 in a further signal course diagram 70. Contrary to the course of the pulse-width modulated control signal 71 illustrated in FIG. 2, a pulse switch 79 occurs during the metering cycle 76, i.e. during the active phase of the metering valve, within the holding phase 78, at which it is switched from the pulse-width modulation 74 ($PWM_1$) to a further pulse-width modulation 75 ($PWM_2$). This is justified in the shown example by a sudden increase of the on-board power voltage. In that case the driver that is implemented into the metering control unit 60 (see FIG. 1) automatically corrects the PWM signal. In the present case the duty cycle of the pulse-width modulation 75 ($PWM_2$) is reduced towards the pulse-width modulation 74 ($PWM_1$), so that the effective value for the absorbed power of the magnetic coil 51 is kept constant. This PWM correction in the active phase can take place when increasing as well as when sinking the feed voltage up to a minimum voltage. Thereby the driver can also directly react upon changes during very long control phases.

With this procedure and the device complex control applications of such actuators can be realized independent of the on-board power voltage, without having to carry out hardware changes or software adjustments. A preferred application of the procedure provides the application in the newest exhaust gas purification systems or exhaust gas after-treatment system of diesel combustion engines, as it is for example the case in the newest generation of the DENOXTRONIC-system of the applicant. The procedure can basically also be extended to the operation of sensors at different on-board power voltages.

The invention claimed is:

1. A procedure for controlling actuators within an on-board power system, the procedure comprising:
    measuring, at a controller, an actual on-board power voltage at the actuators;
    adjusting a pulse width and a cycle duration of a control signal dependently of the actual on-board power voltage; and
    providing different operating voltages or temporal on-board power voltage changes to the actuators according to the adjusted pulse width and cycle duration.

2. The procedure according to claim 1, further comprising:
    detecting an erratic change in the on-board power voltage; and
    switching from a first pulse width modulation to a second pulse-width modulation by a pulse switch in response to the detected erratic change in the on-board power voltage.

3. The procedure according to claim 1, wherein the pulse-width, the cycle duration, or both, of the control signal are adjusted quasi continuously in response to a continuous change of the on-board power voltage.

4. The procedure according to claim 1, further comprising maintaining a constant effective power of the control signal as the pulse-width is being adjusted.

5. The procedure according to claim 1, wherein the control signal of the actuator is created from several temporarily consecutive pulse-width modulated signals.

6. The procedure according to claim 1, wherein adjusting the pulse-width of the control signal occurs during an active control phase of the actuator.

7. Application of the procedure according to claim 1 for controlling a magnetic coil of a metering valve construed as actuator for injecting a reducing agent into the exhaust gas system of a diesel combustion engine.

8. A device for controlling actuators within an on-board power system, the device comprising:
    a control unit configured to:
        specify control signals for the actuators, the control signals being, pulse-width modulated control signals,
        adjust a pulse-width and a cycle duration of the control signals independent of each other,
        detect an actually applied on-board power voltage as well as driver units, and
        adjust an operating voltage at the actuators by specifying a pulse-width modulation of the control signals at specified times.

9. The device according to claim 8, wherein the functionality of the control unit is integrated in a metering control unit of an exhaust gas purification system of a diesel combustion engine for controlling a magnetic coil of a metering valve construed as actuator for injecting a reducing agent into the exhaust gas system of the diesel combustion engine.

* * * * *

UNITED STATES PATENT AND TRADEMARK OFFICE
CERTIFICATE OF CORRECTION

| | |
|---|---|
| PATENT NO. | : 8,723,456 B2 |
| APPLICATION NO. | : 13/009349 |
| DATED | : May 13, 2014 |
| INVENTOR(S) | : Daemmrich et al. |

It is certified that error appears in the above-identified patent and that said Letters Patent is hereby corrected as shown below:

In the Claims

Column 6, lines 42-44, the 3rd through 5th lines of claim 8, should read as follows:

a control unit configured to:
      specify control signals for the actuators, the control sig-
        nals being pulse-width modulated control signals, Signed and Sealed this
Eleventh Day of November, 2014

Michelle K. Lee
*Deputy Director of the United States Patent and Trademark Office*